United States Patent [19]
De Filippo

[11] Patent Number: 5,346,282
[45] Date of Patent: Sep. 13, 1994

[54] HEADREST FOR MOTOR-VEHICLE SEATS, PARTICULARLY FOR REAR SEATS

[75] Inventor: Emilio De Filippo, Bruzolo, Italy

[73] Assignee: Gestind-M.B. "Manifattura di Bruzolo S.p.A., Bruzolo, Italy

[21] Appl. No.: 29,051

[22] Filed: Mar. 9, 1993

[30] Foreign Application Priority Data

Oct. 14, 1992 [IT] Italy .......................... T092 A 000823
Oct. 14, 1992 [IT] Italy .......................... T092 A 000825

[51] Int. Cl.$^5$ ................................................ B60N 2/02
[52] U.S. Cl. ............................... 297/395; 297/403
[58] Field of Search ............. 297/395, 406, 391, 403, 297/411.21, 411.22, 411.31; 280/801, 808, 803

[56] References Cited

U.S. PATENT DOCUMENTS

| | | | |
|---|---|---|---|
| 360,789 | 4/1887 | Wiseman | 297/395 |
| 2,649,142 | 8/1953 | New | 293/395 |
| 3,310,342 | 3/1967 | Drelichowski | 297/395 |
| 3,498,671 | 3/1970 | Coon et al. | 297/403 |
| 3,964,788 | 6/1976 | Kmetyko | 297/395 |
| 4,249,754 | 2/1981 | Best | 297/395 X |
| 4,725,076 | 2/1988 | Taylor | 297/395 X |
| 4,907,835 | 3/1990 | Salters | 297/411.21 X |

FOREIGN PATENT DOCUMENTS 274484  5/1930  Italy .................. 297/403

*Primary Examiner*—Laurie K. Cranmer
*Attorney, Agent, or Firm*—Sughrue, Mion, Zinn, Macpeak & Seas

[57] ABSTRACT

A headrest (6) for a motor-vehicle seat, particularly for a rear seat, is separated from the backrest (1) of the seat and is supported in a cantilever fashion on one side thereof by a support element (7). The headrest (6) is pivotally mounted on the support element (7) and is movable between an operative position of normal use and an inoperative position, adjacent to the wall of the motor-vehicle compartment.

4 Claims, 2 Drawing Sheets

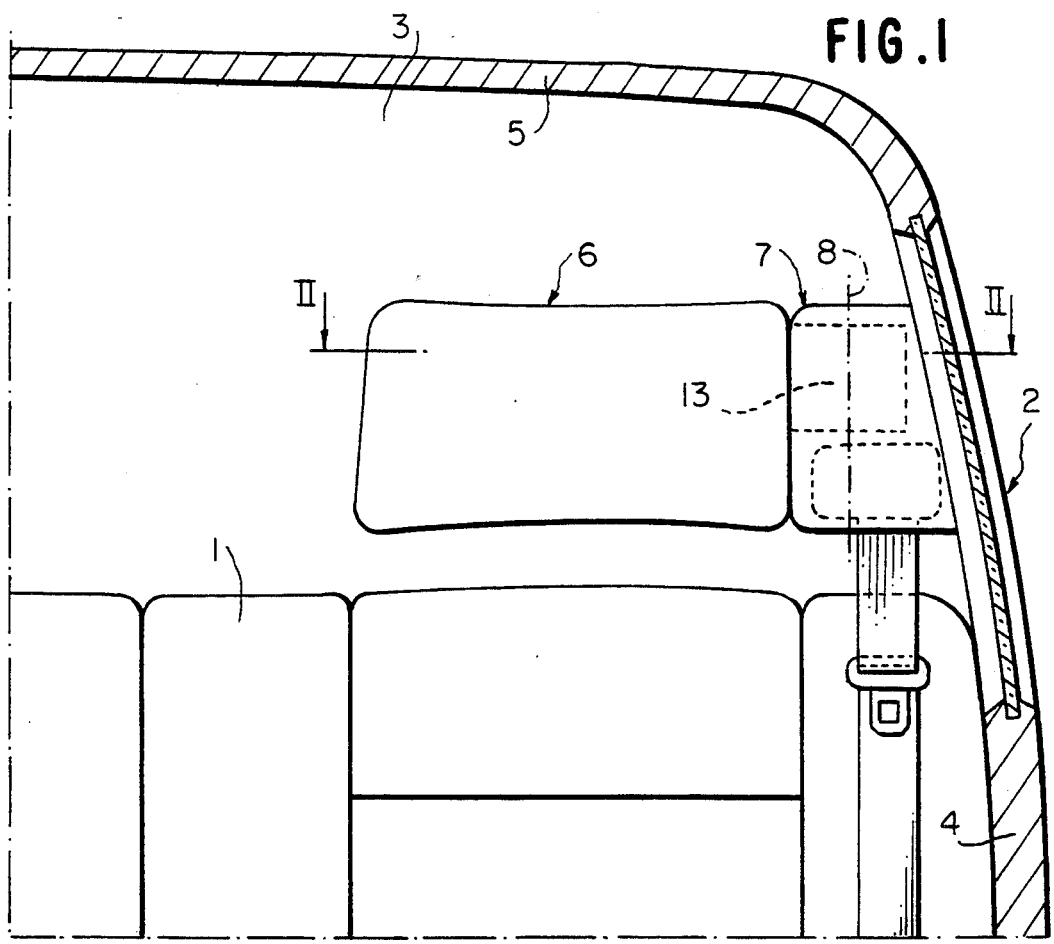
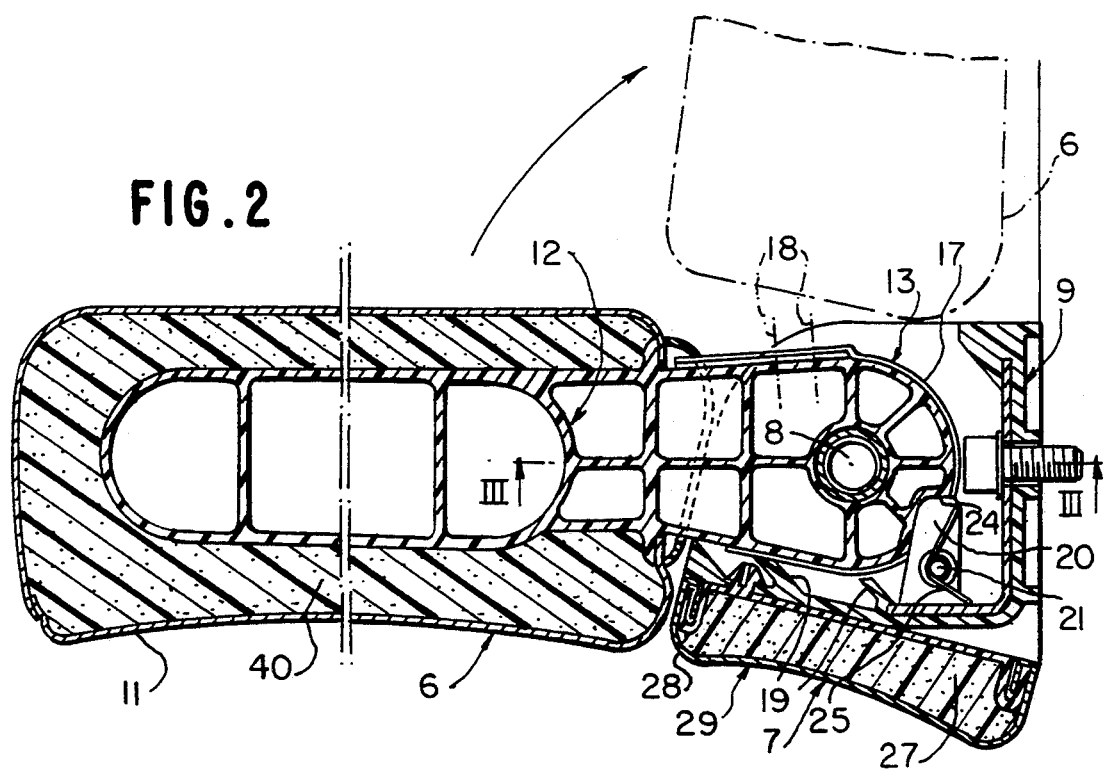

HEADREST FOR MOTOR-VEHICLE SEATS, PARTICULARLY FOR REAR SEATS

BACKGROUND OF THE INVENTION

The present for motor-vehicle seats, particularly for rear The present invention relates to headrests for motor-vehicle seats and in particular to headrests for rear seats.

SUMMARY OF THE INVENTION

An inconvenience which takes place in cars having rear seats with headrest is that of a great limitation of visibility of the driver when the vehicle moves rearwardly. In cars with rear hatch door, wherein the backrest of the rear seat can be tilted downwardly to increase the load capacity of the luggage compartment there is an interference between the headrest of the rear seat, when the backrest of the latter is tilted down, and the backrest of the front seat which causes the user to remove the headrest from the rear seat, with the resulting loss of time, before attending to tilting downwardly the backrest of the rear seat.

In order to overcome the above-mentioned drawbacks, the present invention provides a headrest for motor-vehicle seats, particularly for rear seats, characterized in that it is separated from the backrest of the respective seat and is pivotally supported on one side thereof by a support element which is fixed to a wall of the motor-vehicle compartment, said headrest being movable between an operative position of normal use and an inoperative position, adjacent to a wall of the motor-vehicle compartment.

Due to this feature, the user may bring the headrest in its inoperative position, in order to increase visibility during rearward travelling, or to allow the backrest of the rear seat to be tilted down, with a very simple and rapid operation.

According to a further preferred feature, said support element on which the headrest is articulated has a support surface acting as a side cushion arranged on the extension of the headrest surface, so as to greatly increase the comfort of the occupant of the rear seat.

Still according to a further preferred feature, said support element includes a guide member and/or a winding device for a safety belt associated with the seat. Thus, said element is called to fulfil both the support function for the headrest, and the function of side cushion as already stated above, and the function of masking the guide member or the winding device for the safety belt.

In a preferred embodiment, said support element further includes a mechanism for locking the headrest in its operative position, and spring means operatively interposed between the support element and the headrest structure, biassing the headrest towards its inoperative position. Said locking mechanism is provided with an actuating member disposed outside of said support element. By acting on said actuating member, the user can cause unlocking of the locking mechanism and the resulting automatic movement, caused by said spring means, of the headrest to its inoperative position. Subsequently, the headrest may be brought again manually into its operative position until the snap engagement of the locking mechanism is obtained.

In said preferred embodiment, the spring means which urges the headrest towards its inoperative position is comprised of a leaf spring having one end fixed to the headrest structure and the opposite end reacting against the support element. When the headrest is in its operative position, the leaf spring is bent according to a C shape, so that, as soon as the locking mechanism is unlocked, the leaf spring tends to unbend, bringing the headrest into its inoperative position.

Naturally although the invention is illustrated with particular reference to a rear seat of a motor-vehicle, its application to a front seat is not excluded.

BRIEF DESCRIPTION OF THE DRAWINGS

Further features and advantages of the invention will become clearly apparent from the description which follows with reference to the annexed drawings, given purely by way of non limiting example, in which:

FIG. 1 is a diagrammatic front view of a headrest according to the present invention, FIG. 2 is a cross-sectional view, on an enlarged scale, according to line II—II of FIG. 1.

DETAILED DESCRIPTION OF THE INVENTION

Figure 4:
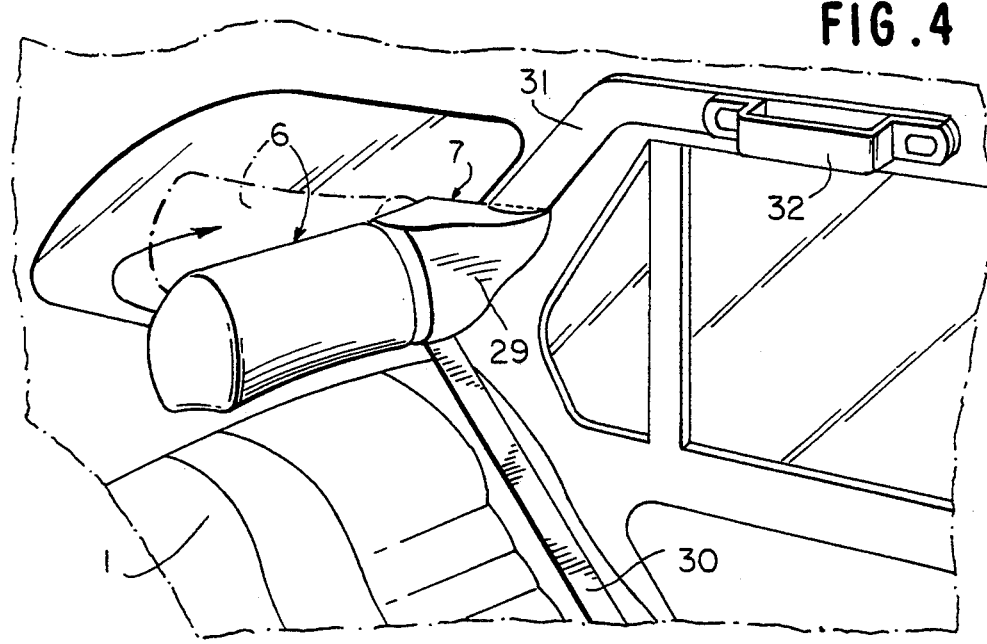
FIG. 4 is a perspective view of a preferred embodiment of the headrest according to the invention.

In the drawings, reference numeral 1 designates the backrest of the rear seat of a car 2 having a compartment 3 with a left side wall 4, a roof 5 and a right side wall (not visible). In the present description, the terms "left" and "right" are used with reference to the direction of movement of the vehicle. Also with reference to FIG. 1, the left portion of the backrest 1 is provided with a headrest indicated generally by numeral 6. The right portion of the backrest is also provided with a headrest identical and simmetrical with respect to the headrest 6. The annexed drawings and the following description disclose the arrangement of the left headrest in detail. The arrangement of the right headrest (not visible in the drawings) is analogous.

As clearly apparent from FIG. 1, the headrest 6 is separated from the backrest 1 of the rear seat and, in the case of the illustrated example, is spaced apart from the upper edge of this backrest. Therefore, the headrest according to the invention is not supported by the structure of the seat backrest as in the conventional solutions. It is instead supported on one side thereof in a cantilever fashion by a support element 7 which is fixed to the side wall 4 of the car compartment. More precisely, the headrest 6 is pivotally supported around a vertical axis 8 by the support element 7 and is movable between an operative position of normal use (illustrated with undotted line in the drawings) and an inoperative position, adjacent to the side wall of the compartment, which is illustrated by dotted line in FIGS. 2, 4.

Figure 3:
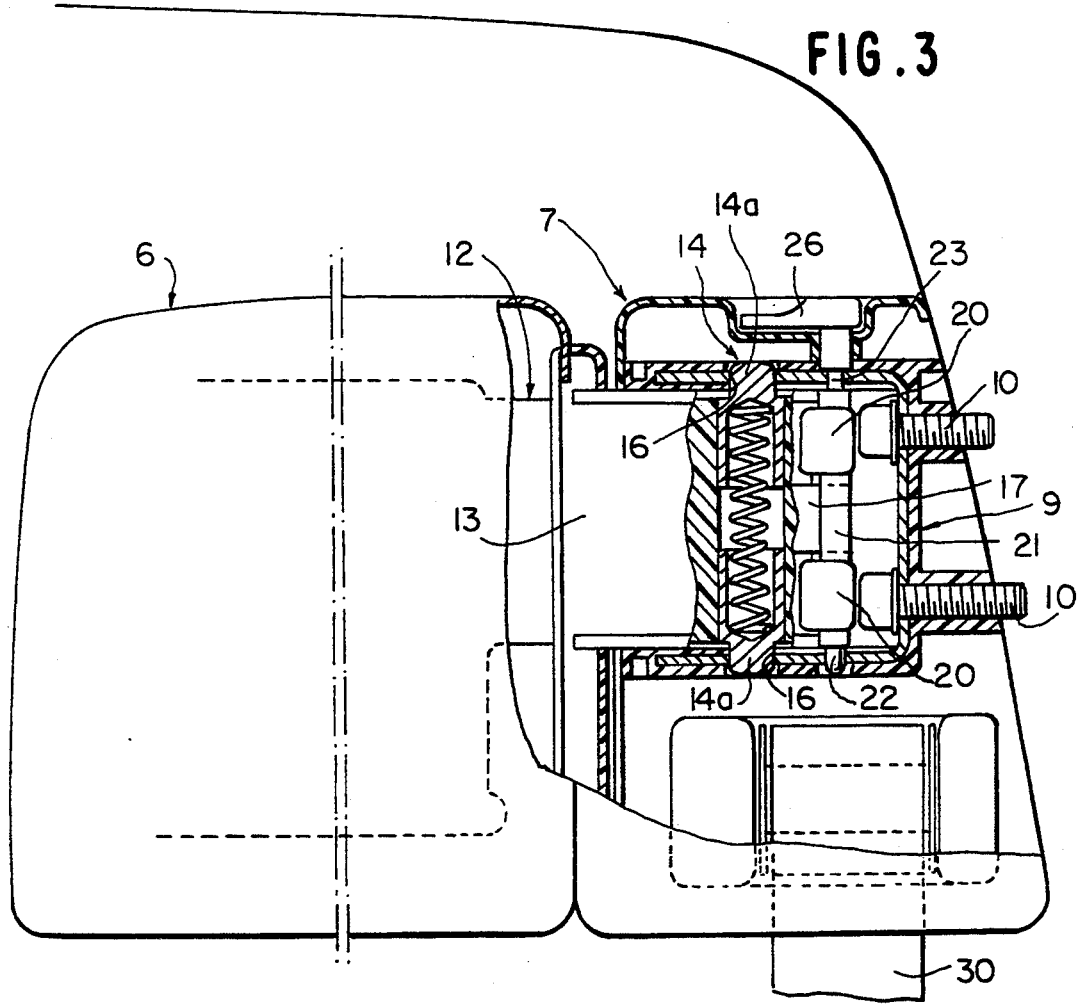
FIG. 3 is a view on an enlarged scale of a detail of FIG. 1, partially sectioned according to line III—III of FIG. 2.

With reference to FIGS. 2, 3, in the case of the example described herein, the support element 7 has a support structure 9 fixed to the car body by screws 10. The headrest 6 has, as it is usual, a padding 40 provided with a cover 11, wherein a frame 12 is embedded. The frame 12 has a connecting portion 13 arranged outside of the padding 10 and pivotally mounted onto the structure 9 of the support element 7 by interposition of a pivot pin 14. Also with reference to the particular example illustrated, the pin 14, for convenience in mounting, is comprised of two cap-like elements 14a (FIG. 3) having an helical spring 15 interposed therebetween and engaging opposite holes 16 formed in the structure 9 of the support element 7. The connecting portion 13 of the headrest 6 has a cylindrical surface around which there is wrapped a leaf spring 17 having one end fixed to portion 13 by screws 18 (diagrammatically illustrated in FIG. 2 by their respective axes) and having the opposite end reacting against the inner ribs 19 of structure 9 (FIG. 2). As apparent from FIG. 2, when the headrest 6 is in its position of normal use, the leaf spring 17 is bent according to a C shape so that it tends to unbend, pushing the headrest 6 into the inoperative position illustrated by dotted line in FIG. 2. The headrest 6 is held in its operative position, against the action of leaf spring 17, by a locking mechanism including a pair of pawls 20 (FIG. 2, 3) arranged on a same shaft 21 having end portions 22, 23 which are rotatably and freely supported within cooperating holes formed in the structure 9 of the support element 7. To the shaft 21 there is associated a pin spring 25 (FIG. 2) which tends to keep the pawls 20 in an engagement position within respective notches 24 (FIG. 2) of the connecting portion 13 of the headrest 6, so as to lock the headrest 6 in its operative position, against the action of the leaf spring 17. The end portion 23 of the shaft 21 is connected to an actuating lever 26 arranged above the support element 7 and accessible from the outside. By acting on the actuating lever 26, it is possible to rotate the shaft 21 against the action of the pin spring 25, so as to free the pawls 20 from their respective seats 24, so as to allow the resulting movement of the headrest towards its inoperative position, under the action of the leaf spring 17. Subsequently, it is possible to grasp the headrest 6 and move it back manually into its operative position illustrated in FIG. 2 until the snap engagement of the pawls 20 in their respective seats 24 is obtained so that the headrest is locked in its operative position.

According to a further feature, the support element 7 is provided at its front portion with a padding 27 with a cooperating cover 28, which define a support surface 29 arranged as an the extension of the surface of the headrest 6 and acting as a side cushion, to improve the comfort of the passenger.

Still according to a further preferred embodiment, the structure of the support element 7 masks also a guide device and/or a winding device for a safety belt 30 associated with the rear seat. The support element 7 is then called to fulfil various functions. On one hand, it fulfills the primary function to support in a cantilever fashion the headrest 6, allowing the latter to be brought rapidly in its inoperative position when one desires to increase visibility during rearward travelling or tilt down the backrest of the rear seat. On the other hand, it fulfills the function of a side cushion, improving thereby the comfort of the passenger. Last it masks the structure of the winding device and/or the guide member of the safety belt associated with the rear seat. To this end, the structure 9 of the support element 7 is provided with a slot from which the safety belt is extracted.

FIG. 4 of the drawings shows an alternative embodiment in which the support element 7 is rigidly connected to a further element 31 which supports a handle 32 provided on the side wall of the compartment above the window.

Naturally, the principle of the invention remaining the same, the details of construction and embodiments may widely vary with respect to what has been described purely by way of example, without departing from the scope of the present invention.

What is claimed is:

1. Headrest for motor-vehicle seats, particularly for rear seats, wherein said headrest is separated from the backrest of the respective seat and is pivotally supported on one side thereof by a support element fixed to a wall of the motor-vehicle compartment, said headrest being movable between an operative position of normal use and an inoperative position, adjacent to the wall of the compartment, wherein said support element includes a winding device for a safety belt associated with the motor-vehicle seat.

2. Headrest for motor-vehicle seats, particularly for rear seats, wherein said headrest is separated from the backrest of the respective seat and is pivotally supported on one side thereof by a support element fixed to a wall of the motor-vehicle compartment, said headrest being movable between an operative position of normal use and an inoperative position, adjacent to the wall of the compartment, wherein said support element includes a mechanism for locking the headrest in its operative position, and spring means operatively interposed between the support element and the headrest, and biasing the headrest towards its inoperative position.

3. Headrest according to claim 6, wherein said spring are comprised of a leaf spring having one end fixed to the headrest (6) and the opposite end reacting against the support element, said leaf spring having a C shape in the operative position of the headrest.

4. Headrest according to claim 2, wherein said locking mechanism comprises a shaft which is rotatably and freely mounted in the support element and provided with at least one pawl for cooperation with a corresponding seat of the headrest to lock the latter in its operative position, said shaft of the locking mechanism being provided with spring means tends to hold the pawl in its engagement position within the respective seat and being rigidly connected to an actuating lower which is accessible outside the support element.

* * * * *